(12) United States Patent
Furusawa

(10) Patent No.: US 10,041,194 B2
(45) Date of Patent: Aug. 7, 2018

(54) REINFORCEMENT CORD FOR REINFORCING RUBBER PRODUCT, AND RUBBER PRODUCT USING SAME

(75) Inventor: Masamori Furusawa, Tokyo (JP)

(73) Assignee: NIPPON SHEET GLASS COMPANY, LIMITED, Tokyo (JP)

(*) Notice: Subject to any disclaimer, the term of this patent is extended or adjusted under 35 U.S.C. 154(b) by 899 days.

(21) Appl. No.: 14/119,017

(22) PCT Filed: Jun. 8, 2012

(86) PCT No.: PCT/JP2012/003765
§ 371 (c)(1),
(2), (4) Date: Nov. 20, 2013

(87) PCT Pub. No.: WO2012/169207
PCT Pub. Date: Dec. 13, 2012

(65) Prior Publication Data
US 2014/0093729 A1    Apr. 3, 2014

(30) Foreign Application Priority Data

Jun. 10, 2011 (JP) ................. 2011-130445

(51) Int. Cl.
*D02G 3/36* (2006.01)
*C08K 3/04* (2006.01)
*C08K 7/02* (2006.01)
*F16G 1/08* (2006.01)
*F16G 1/28* (2006.01)
*F16G 5/06* (2006.01)
(Continued)

(52) U.S. Cl.
CPC ................ *D02G 3/36* (2013.01); *C08J 5/06* (2013.01); *C08K 3/04* (2013.01); *C08K 7/02* (2013.01); *D02G 3/02* (2013.01); *D02G 3/447* (2013.01); *D06M 15/693* (2013.01); *F16G 1/08* (2013.01); *F16G 1/28* (2013.01); *F16G 5/06* (2013.01); *F16G 5/20* (2013.01); *C08K 3/36* (2013.01);
(Continued)

(58) Field of Classification Search
CPC ..... F16G 1/08; F16G 1/28; F16G 5/06; F16G 5/20; Y10T 428/2918; D02G 3/36; D02G 3/02; D02G 3/447
USPC ........................ 428/367, 292.1; 474/204, 260
See application file for complete search history.

(56) References Cited

U.S. PATENT DOCUMENTS 6,872,159 B2    3/2005 Knutson
2004/0132571 A1    7/2004 Knutson
(Continued)

FOREIGN PATENT DOCUMENTS

CN    1529800 A    9/2004
CN    1837276 A    9/2006
(Continued)

*Primary Examiner* — Vincent Tatesure
(74) *Attorney, Agent, or Firm* — Abel Law Group, LLP

(57) ABSTRACT

The reinforcing cord of the present invention includes at least one strand. The strand includes a bundle of filaments that are bundled and twisted together in one direction, and a coating layer that is formed on at least the surface of the bundle. The bundle consists essentially of carbon fiber filaments. The coating layer is a coating layer that is formed from an aqueous treatment agent containing a rubber latex and a crosslinking agent as essential components and a filler as an optional component. In the aqueous treatment agent, the total of the mass of the crosslinking agent and the mass of the filler is in a range of 1 to 50% of the mass of rubber in the rubber latex.

19 Claims, 1 Drawing Sheet

(51) Int. Cl.
*D06M 15/693* (2006.01)
*C08J 5/06* (2006.01)
*D02G 3/02* (2006.01)
*F16G 5/20* (2006.01)
*D02G 3/44* (2006.01)
*C08K 3/36* (2006.01)
*D06M 101/40* (2006.01)

(52) U.S. Cl.
CPC ..... *D06M 2101/40* (2013.01); *D10B 2101/12* (2013.01); *Y10T 428/2918* (2015.01)

(56) References Cited

U.S. PATENT DOCUMENTS

| | | | |
|---|---|---|---|
| 2006/0063884 A1* | 3/2006 | Akiyama | C08K 5/098 524/555 |
| 2006/0148989 A1 | 7/2006 | Burrowes et al. | |
| 2007/0028583 A1* | 2/2007 | Kajihara | D02G 3/18 57/210 |
| 2008/0166576 A1* | 7/2008 | Akiyama | B29D 29/08 428/500 |
| 2010/0233422 A1 | 9/2010 | Knowles | |

FOREIGN PATENT DOCUMENTS

| | | |
|---|---|---|
| CN | 101161710 A | 4/2008 |
| CN | 101384648 A | 3/2009 |
| JP | 60-181369 A | 9/1985 |
| JP | 2004100113 A | 4/2004 |
| JP | 2004225178 A | 8/2004 |
| JP | 2004-535517 A | 11/2004 |
| JP | 2006-089877 A | 4/2006 |
| JP | 2009-526924 A | 7/2009 |
| JP | 2009-297894 A | 12/2009 |
| JP | 2010024564 A | 2/2010 |

\* cited by examiner

REINFORCEMENT CORD FOR REINFORCING RUBBER PRODUCT, AND RUBBER PRODUCT USING SAME

TECHNICAL FIELD

The present invention relates to a reinforcing cord for reinforcing a rubber product and to a rubber product including the reinforcing cord.

BACKGROUND ART

A rubber belt or a chain is used for driving a camshaft of an internal combustion engine of an automobile, driving an auxiliary unit such as an injection pump, or power transmission in an industrial machine. Generally, a rubber belt includes a rubber portion and a reinforcing cord embedded in the rubber portion. Since the strength of the rubber belt depends on the strength of the reinforcing cord, the reinforcing cord is an important component that determines the life of the rubber belt. Typically, the reinforcing cord includes reinforcing fibers and a coating layer formed on the surface of the fibers. As examples of such a reinforcing cord, rubber belts in which carbon fibers are used as reinforcing fibers have been proposed (for example, JP 2004-225178 A and JP 2010-024564 A).

A reinforcing cord using carbon fibers has a drawback that the tensile strength of the cord decreases as the belt moves. One of the causes may be that the fibers in the reinforcing cord are locally broken due to local high stress concentration thereon during use, and thus the strength of the reinforcing cord decreases. Another cause may be the deterioration of the coating layer of the reinforcing cord. As the coating layer deteriorates, the effect of protecting the fibers decreases, and the integrity, flexibility, etc. of the cord decrease accordingly.

The elongation at break of many of glass fiber cords used as reinforcing cords is about 4%. On the other hand, the elongation at break of carbon fiber cords as high-modulus fiber cords is as low as about 2%. Therefore, the fact that brittle and high-modulus fibers such as carbon fibers have such a low elongation at break should be kept in mind when they are used in a reinforcing cord. That is, when the reinforcing cord is subjected to a given bending deformation, it should be protected from overload that would result in breakage of carbon fibers. If the coating layer formed on the reinforcing fibers is hard, the load on the reinforcing fibers may increase when the reinforcing cord is subjected to bending deformation.

On the other hand, as one of the techniques for obtaining a carbon fiber cord which is flexible for bending deformation, it may be possible to increase the number of twists of the cord. However, since the elastic modulus of the cord decreases if the number of twists is increased, such a cord cannot be used for applications that require high-modulus belts.

CITATION LIST

Patent Literature

Patent Literature 1: JP 2004-225178 A
Patent Literature 2: JP 2010-024564 A

SUMMARY OF INVENTION

Technical Problem

Not only the bending fatigue resistance but also the adhesion to a matrix rubber is an important factor for the reinforcing cord. Therefore, improvement of treatment agents for forming a coating layer on the surface of reinforcing fibers is required. A coating layer having a higher content of components (such as a crosslinking agent and a resin) other than a latex tends to have better adhesion, although the coating layer becomes harder. Therefore, it is difficult to obtain a carbon fiber cord being flexible for bending deformation, having a high modulus, and exhibiting good adhesion to a matrix rubber.

Under these circumstances, one of the objects of the present invention is to provide a reinforcing cord using carbon fibers and having good bending fatigue resistance and good adhesion to a matrix rubber.

Solution to Problem

The reinforcing cord of the present invention is a reinforcing cord for reinforcing a rubber product, including at least one strand. In this reinforcing cord, the strand includes: a bundle of filaments that are bundled and twisted together in one direction; and a coating layer that is formed on at least a surface of the bundle. The bundle consists essentially of carbon fiber filaments. The coating layer is a coating layer that is formed from an aqueous treatment agent containing a rubber latex and a crosslinking agent as essential components and a filler as an optional component. In the aqueous treatment agent, a total of a mass of the crosslinking agent and a mass of the filler is in a range of 1 to 50% of a mass of rubber in the rubber latex.

The rubber product of the present invention is reinforced by the reinforcing cord of the present invention.

Advantageous Effects of Invention

In the reinforcing cord of the present invention, the total amount of the crosslinking agent and the filler in the treatment agent for forming the coating layer is limited to a predetermined range, and thereby, both the flexibility and adhesion of the coating layer can be achieved. Thus, according to the present invention, it is possible to obtain a reinforcing cord using carbon fibers and having good bending fatigue resistance and good adhesion to a matrix rubber.

DESCRIPTION OF EMBODIMENTS

Figure 1:
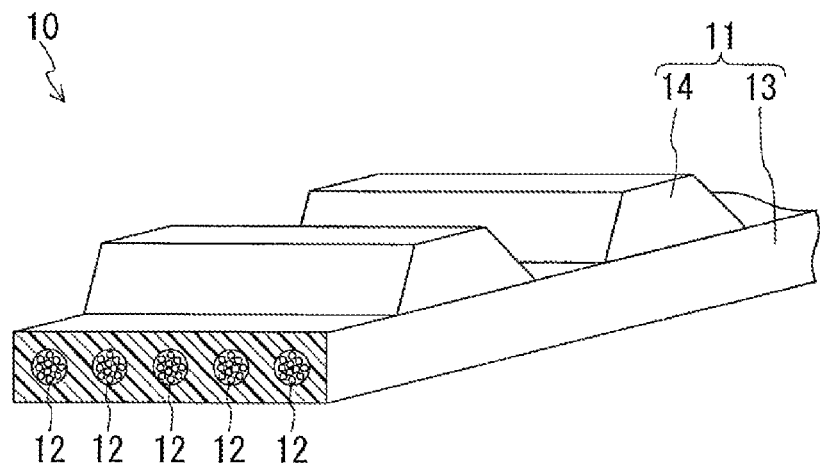
FIG. 1 is a partial cross-sectional perspective view showing an example of a rubber product including a reinforcing cord of the present invention.

Embodiments of the present invention are described below. In the following description, the embodiments of the present invention will be described by way of examples, but the present invention is not limited to the examples described below. In the description below, specific numerical values and materials may be shown as examples, but the other numerical values and materials may be used as long as the effects of the present invention are obtained. Furthermore, the compounds described below may be used alone or in combination of two or more thereof, unless otherwise specified.

[Reinforcing Cord]

The reinforcing cord of the present invention is a cord for reinforcing a rubber product. This reinforcing cord includes at least one strand. The strand includes: a bundle of filaments that are bundled and twisted together in one direction; and a coating layer that is formed on at least a surface of the bundle. The bundle consists essentially of carbon fiber filaments. The coating layer is a coating layer that is formed from an aqueous treatment agent containing a rubber latex and a crosslinking agent as essential components and a filler as an optional component. That is, the aqueous treatment agent contains a rubber latex and a crosslinking agent, and may or may not further contain a filler. In the aqueous treatment agent, the total of the mass of the crosslinking agent and the mass of the filler is in a range of 1 to 50% of the mass of rubber in the rubber latex. Hereinafter, the aqueous treatment agent used to form the coating layer may be referred to as an "aqueous treatment agent (A)".

The filler is an optional component. Therefore, in another aspect, the aqueous treatment agent (A) is a treatment agent in which the mass of the crosslinking agent is in a range of 1 to 50% of the mass of the rubber in the rubber latex. In the case where the aqueous treatment agent (A) contains a filler, in that aqueous treatment agent (A), the total of the mass of the crosslinking agent and the mass of the filler is in a range of 1 to 50% of the mass of the rubber in the rubber latex.

The number of strands in the reinforcing cord is not limited. It may be one, or may be two or more. In the case where the reinforcing cord includes two or more strands, they may be finally twisted. The bundle of filaments may be a bundle of two or more bundles of filaments. In this case, each of the bundles of filaments may or may not be twisted.

The aqueous treatment agent (A) contains a rubber latex as a main component. As used herein, the main component refers to a component whose solid content is 50% by mass or more of the solid content of the aqueous treatment agent. Preferably, the aqueous treatment agent (A) contains, as a main component, a latex of at least one rubber selected from the group consisting of nitrile rubber, hydrogenated nitrile rubber, carboxyl-modified nitrile rubber, and carboxyl-modified hydrogenated nitrile rubber. The aqueous treatment agent (A) may contain only one of these rubber latexes, or may contain two or more of these rubber latexes. These rubber latexes are preferred because they are less susceptible to swelling in oil and have high oil resistance. In this description, the term "nitrile rubber" refers to a nitrile rubber (acrylonitrile-butadiene copolymer rubber) that is neither hydrogenated nor carboxyl-modified, unless otherwise specified.

The iodine value of hydrogenated nitrile rubber is normally 120 or less, and it may be 100 or less, for example. The iodine value of the hydrogenated nitrile rubber as an example is in a range of 0 to 50.

The aqueous treatment agent (A) may contain another rubber latex in addition to the above-mentioned rubber latex. Examples of the other rubber latex include a butadiene-styrene copolymer latex, a dicarboxylated butadiene-styrene copolymer latex, a vinylpyridine-butadiene-styrene terpolymer latex, a chloroprene latex, a butadiene latex, and a chlorosulfonated polyethylene latex. The aqueous treatment agent (A) may contain two or more of these rubber latexes.

Preferably, the ratio of the rubber in the latex to the solid content of the aqueous treatment agent (A) is 60% by mass or more. This ratio may be in a range of 50 to 99% by mass or in a range of 75 to 97% by mass. The coating layer having a higher content of latex becomes more flexible, while the adhesion of the coating layer decreases. Therefore, it is preferable to determine the ratio of the rubber to the aqueous treatment agent (A) in consideration of the compatibility with the matrix rubber and the ease of adhesion thereto.

When the ratio of the rubber to the solid content of the aqueous treatment agent (A) is less than 50% by mass, the flexibility of the reinforcing cord decreases, which may result in a decrease in the life of the resulting rubber product (for example, a rubber belt).

The aqueous treatment agent (A) contains a crosslinking agent. The use of this crosslinking agent improves the adhesion to the matrix rubber. Examples of the crosslinking agent contained in the aqueous treatment agent (A) include: quinone dioxime crosslinking agents such as p-quinone dioxime; methacrylate crosslinking agents such as lauryl methacrylate and methyl methacrylate; allyl crosslinking agents such as diallyl fumarate (DAF), diallyl phthalate (DAP), triallyl cyanurate (TAC), and triallyl isocyanurate (TAIC); maleimide crosslinking agents such as bis-maleimide, phenyl-maleimide, and N,N'-m-phenylene-dimaleimide; aromatic or aliphatic organic diisocyanate; polyisocyanate; blocked isocyanate; blocked polyisocyanate; aromatic nitroso compounds; sulfur; and peroxides. These crosslinking agents may be used alone or in combination of two or more of them. These crosslinking agents are selected in view of the type of the rubber latex contained in the aqueous treatment agent, the type of the matrix rubber in which the reinforcing cord is to be embedded, etc. It is preferable to use these crosslinking agents in the form of a water dispersion in order to allow them to be homogeneously present in the aqueous treatment agent. The crosslinking agent may be at least one selected from the group consisting of maleimide crosslinking agents, organic diisocyanates, and aromatic nitroso compounds.

Among the above-mentioned crosslinking agents, it is preferable to use at least one selected from the group consisting of maleimide crosslinking agents and polyisocyanates. Among the maleimide crosslinking agents, 4,4'-bis-maleimide diphenylmethane is suitably used because it is stable when it is dispersed in water, has a high crosslinking effect, and has high heat resistance after crosslinking. When each of a maleimide crosslinking agent and polyisocyanate is used in combination with a rubber latex, the maleimide crosslinking agent and polyisocyanate each can specifically enhance the adhesion between the reinforcing cord and the matrix rubber. In particular, a combination of a latex of a carboxyl-modified hydrogenated nitrile rubber and a maleimide crosslinking agent is preferred because it can further enhance the adhesion.

In the aqueous treatment agent (A), the mass of the crosslinking agent is preferably in a range of 1 to 50% (for example, in a range of 1 to 40%), more preferably in a range of 1 to 30%, further preferably in a range of 1 to 25%, and particularly preferably in a range of 1 to 20%, respectively, with respect to the mass of the rubber in the rubber latex. The mass of the crosslinking agent may be in a range of 1 to 10%. It is possible to form a coating layer having both adhesion and flexibility when the mass of the crosslinking agent is in the above range.

Preferably, the aqueous treatment agent (A) contains a filler. The filler contained in the aqueous treatment agent (A) is not particularly limited. Examples of the filler include fine particles of covalently bonded compounds such as silica and carbon black, fine particles of insoluble salts, fine particles of metal oxides, fine particles of metal hydroxides, and fine particles of composite metal oxide salts such as talc. Among these, at least one selected from the group consisting of silica and carbon black is preferred.

The average particle diameter of silica is preferably in a range of 5 to 200 nm, and for example, in a range of 7 to 100 nm. It is more preferably in a range of 7 to 30 nm. The average particle diameter of carbon black is preferably in a range of 5 to 300 nm, and for example, in a range of 100 to 200 nm. It is more preferably in a range of 130 to 170 nm. As used herein, the average particle diameter refers to a value obtained by measuring the particle diameters of 50 or more particles using a transmission electron microscope and dividing the total of the particle diameters by the number of the particles measured. When the particles are not spherical, the average of the longest diameter and the shortest diameter of each particle is determined as the particle diameter of the particle.

The presence of the filler dispersed in the rubber has the effect of improving the properties, such as the tensile strength, tear strength, etc., of the coating layer. In addition to these effects, the filler also has the effect of increasing the cohesion of adhesive components between the fibers and the coating layer and between the coating layer and the matrix rubber and thereby increasing the adhesive strength therebetween. These effects are significantly affected by the particle diameter and the content of the filler.

In the aqueous treatment agent (A), the mass of the filler is preferably in a range of 1 to 20%, more preferably in a range of 1 to 10%, and further preferably in a range of 1 to 5%, respectively, with respect to the mass of the rubber in the rubber latex. When the mass of the filler is in this range, it is possible to obtain the effect of increasing the adhesive strength between the reinforcing cord and the matrix rubber while suppressing an increase in the hardness of the coating layer. When the mass of the filler exceeds 20% of the mass of the rubber in the rubber latex, the bending fatigue resistance of the reinforcing cord is likely to decrease.

When the aqueous treatment agent (A) contains the crosslinking agent and the filler, it is preferable that in the aqueous treatment agent (A), the mass of the crosslinking agent be in a range of 1 to 30%, the mass of the filler be in a range of 1 to 20%, and the total mass of the crosslinking agent and the filler be in a range of 2 to 50%, with respect to the mass of the rubber in the rubber latex. It is more preferable that in the aqueous treatment agent (A), the mass of the crosslinking agent be in a range of 1 to 30%, the mass of the filler be in a range of 1 to 10%, and the total mass of the crosslinking agent and the filler be in a range of 2 to 40%, with respect to the mass of the rubber in the rubber latex. It is further preferable that in the aqueous treatment agent (A), the mass of the crosslinking agent be in a range of 1 to 20%, the mass of the filler be in a range of 1 to 10%, and the total mass of the crosslinking agent and the filler be in a range of 2 to 30%, with respect to the mass of the rubber in the rubber latex. It is particularly preferable that in the aqueous treatment agent (A), the mass of the crosslinking agent be in a range of 1 to 10%, the mass of the filler be in a range of 1 to 5%, and the total mass of the crosslinking agent and the filler be in a range of 2 to 15%, with respect to the mass of the rubber in the rubber latex. In the aqueous treatment agent (A) as an example, the mass of the crosslinking agent is in a range of 2 to 40%, the mass of the filler is in a range of 1 to 5%, and the total mass of the crosslinking agent and the filler is in a range of 3 to 45%, with respect to the mass of the rubber in the rubber latex.

Preferably, the aqueous treatment agent (A) is free of a resorcinol-formaldehyde condensation product. In that case, there is no need to use substances having a great environmental impact, such as formaldehyde and ammonia, during manufacture of the reinforcing cord, and therefore there is no need for environmental measures for workers. It should be noted, however, that the aqueous treatment agent (A) may contain a resorcinol-formaldehyde condensation product.

In a preferred example, the reinforcing cord of the present invention is formed by applying the aqueous treatment agent (A) to a bundle of filaments and then twisting the bundle in one direction.

The constituent components (components other than a solvent) of the aqueous treatment agent (A) are dispersed or dissolved in the solvent. The solvent in the aqueous treatment agent (A) is an aqueous solvent containing 50% by mass or more of water. The content of water in the aqueous solvent may be 80% by mass or more, 90% by mass or more, or 100% by mass. As the aqueous solvent, water is suitably used because water is easy to handle, makes it easier to control the concentrations of the constituent components, and is much more environmentally friendly than organic solvents. The aqueous solvent may contain a lower alcohol or the like. Examples of the lower alcohol include alcohols having 4 or less or 3 or less carbon atoms (for example, methanol, ethanol, and propanol). Preferably, the aqueous solvent is free of an organic solvent other than the lower alcohol.

The aqueous treatment agent (A) may contain other components in addition to the rubber latex, the crosslinking agent, and the filler. For example, the aqueous treatment agent (A) may contain a resin, a plasticizer, an antioxidant, a stabilizer, a metal oxide not serving as a filler, etc. The aqueous treatment agent (A) may be a resin-free treatment agent.

In order to increase the adhesion to the matrix rubber, the reinforcing cord of the present invention may include a second coating layer formed on the above-described coating layer (first coating layer). The treatment agent for forming the second coating layer may be the same as the aqueous treatment agent (A) or may be different therefrom. For example, the second coating layer may be formed from a treatment agent whose components and solvent are different from those of the aqueous treatment agent (A). The second coating layer can increase the effect of preventing penetration of water or oil into the reinforcing cord. Therefore, the second coating layer is formed particularly preferably in the reinforcing cord used in an environment where the rubber product is exposed to water or oil.

The number of twists of the bundle of filaments, that is, the number of twists given to the bundle of filaments may be in a range of 20 to 160 times per meter, in a range of 30 to 100 times per meter, or in a range of 40 to 80 times per meter. The direction of the twists is not limited. It may be the S direction or the Z direction.

In the reinforcing cord of the present invention, the bundle of filaments consists essentially of carbon fiber filaments. As used herein, the term "consisting essentially of" means that the bundle of filaments may include filaments other than carbon fiber filaments unless they have a great influence on the effects of the present invention.

Typically, the bundle of filaments (i.e., a strand) consists of carbon fiber filaments. However, the bundle of filaments (the strand) may contain filaments (reinforcing fiber filaments) other than carbon fiber filaments as long as the effects of the present invention can be obtained. For example, the bundle of filaments may contain filaments other than carbon fiber filaments at 10% or less (for example, 5% or less or 1% or less) of the cross-sectional area of the bundle. The filaments other than carbon fiber filaments are not particularly limited, and filaments of fibers commonly used as reinforcing fibers can be used.

The number of carbon fiber filament in the strand (the bundle of filaments) may be in a range of 500 to 48000, in a range of 1000 to 24000, or in a range of 1000 to 12000. The number of carbon fiber filaments in the strand may be 500, 1000, 3000, 6000, 12000, 24000, or 48000.

The surface of the carbon fiber filament contained in the above-described bundle may be treated with a sizing agent. That is, the surface of the carbon fiber filament may be subjected to a pretreatment commonly called "sizing". A preferred example of the sizing agent contains at least one selected from the group consisting of an epoxy group and an amino group. Examples of the sizing agent include amino silanes, epoxy silanes, novolak type epoxy resins, bisphenol A type epoxy resins, bisphenol F type epoxy resins, brominated epoxy resins, bisphenol AD type epoxy resins, and glycidyl amine type epoxy resins. Specific examples thereof include Denacol series manufactured by Nagase ChemteX Corporation, Epiclon series manufactured by DIC Corporation, and Epicoat series manufactured by Mitsubishi Chemical Corporation. The use of carbon fiber filament whose surface is treated with a sizing agent makes it possible to increase the adhesion between the matrix rubber and the reinforcing cord.

As the method for depositing a sizing agent on carbon fiber filaments, for example, there is a method for immersing the carbon fiber filaments in a liquid in which the sizing agent is dispersed or dissolved, followed by drying to remove a solvent. The amount of the sizing agent deposited is desirably 0.1 to 3% by mass of the carbon fiber filaments. If the amount of the sizing agent deposited is less than 0.1% by mass, the effect of improving the adhesion is reduced. If the amount of the sizing agent deposited is more than 3% by mass, the bending fatigue resistance may decrease.

The mass of the coating layer may be in a range of 7 to 30% (for example, in a range of 10 to 25% or in a range of 15 to 20%) of the mass of the bundle of filaments. The cord containing a larger amount of the coating layer is more flexible and thus has an improved bending property. However, if the amount of the coating layer is too large, the cord may be more affected by oil or the dimensional stability in the resulting rubber product may decrease. On the other hand, if the amount of the coating layer is too small, the reinforcing fibers cannot be protected sufficiently, and as a result, the life of the resulting rubber product may be reduced.

The type of the carbon fiber filaments is not particularly limited. The diameter of the carbon fiber filaments is not particularly limited. The diameter of the carbon fiber filaments is preferably in a range of 4 μm to 12 μm, more preferably in a range of 5 μm to 8 μm, and further preferably in a range of 5 μm to 7 μm. In another aspect, the average diameter of the carbon fiber filaments is preferably in a range of 4 μm to 12 μm, more preferably in a range of 5 μm to 8 μm, and further preferably in a range of 5 μm to 7 μm.

In a preferred example, the bundle of filaments includes 1000 to 24000 carbon fiber filaments (with a diameter of 4 μm to 12 μm), for example, 6000 to 12000 carbon fiber filaments (with a diameter of 5 μm to 8 μm).

[Rubber Product]

The rubber product of the present invention is a rubber product reinforced by the reinforcing cord of the present invention. The rubber product is not particularly limited. Examples of the rubber product of the present invention include tires for automobiles and bicycles, and transmission belts. Examples of the transmission belts include synchronous transmission belts and friction transmission belts. Examples of the synchronous transmission belts include toothed belts typified by a timing belt for an automobile. Examples of the friction transmission belts include flat belts, round belts, V belts, and V-ribbed belts. That is, the rubber product of the present invention may be a toothed belt, a flat belt, a round belt, a V belt, or a V-ribbed belt.

The rubber product of the present invention is formed by embedding the reinforcing cord of the present invention in a rubber composition (a matrix rubber). The method for embedding the reinforcing cord into the matrix rubber is not particularly limited, and any known method may be employed. The reinforcing cord of the present invention is embedded in the rubber product of the present invention (for example, a rubber belt). Therefore, the rubber product of the present invention has high bending fatigue resistance. Accordingly, the rubber product of the present invention is particularly suitable for use as a vehicle timing belt for a vehicle engine.

The rubber of the rubber composition in which the reinforcing cord of the present invention is to be embedded is not particularly limited. The rubber may be chloroprene rubber, chlorosulfonated polyethylene rubber, ethylene propylene rubber, hydrogenated nitrile rubber, or the like. The hydrogenated nitrile rubber may be a hydrogenated nitrile rubber containing a zinc acrylate derivative (for example, zinc methacrylate) dispersed therein. At least one rubber selected from the hydrogenated nitrile rubber and the hydrogenated nitrile rubber containing a zinc acrylate derivative dispersed therein is preferred from the viewpoints of water resistance and oil resistance. The matrix rubber may further contain carboxyl-modified hydrogenated nitrile rubber. From the viewpoint of adhesion, it is preferable that the coating layer of the reinforcing cord and the rubber composition of the rubber product contain the same type of rubber or consist of the same type of rubber.

FIG. 1 shows a toothed belt as an example of the rubber product. A toothed belt 10 shown in FIG. 1 includes a belt body 11 and a plurality of reinforcing cords 12. The belt body 11 includes a belt portion 13 and a plurality of tooth portions 14 projecting from the belt portion 13 at regular intervals. The reinforcing cords 12 are embedded in the belt portion 13 so that they are parallel to the longitudinal direction of the belt portion 13. The reinforcing cords 12 are each the reinforcing cord of the present invention.

[Method for Producing Reinforcing Cord]

An example of the method for producing the reinforcing cord of the present invention is described below. Since the description of the reinforcing cord of the present invention can be applied to the following production method, the overlapping description may be omitted. The following description of the production method can be applied to the reinforcing cord of the present invention. An example of this production method includes the following steps.

First, a plurality of filaments are bundled together. An aqueous treatment agent (A) is applied to the surface of the bundle. Then, a solvent in the aqueous treatment agent (A) is removed. Specifically, first, a plurality of filaments are aligned with one another and bundled together. The aqueous treatment agent (A) is applied to the surface of the resulting bundle. Then, the solvent in the aqueous treatment agent (A) is removed. The bundle of filaments consists essentially of carbon fiber filaments.

A coating layer is formed by the above steps. The method for applying the aqueous treatment agent (A) is not limited, and for example, the bundle of filaments may be immersed in the aqueous treatment agent (A). The method for removing the solvent is not limited, and for example, the solvent may be removed using a drying furnace. The drying conditions for removing the solvent are not particularly limited.

For example, the solvent may be removed by drying the bundle in an atmosphere of 80° C. to 300° C. for 0.1 to 2 minutes.

The bundle of filaments coated with the coating layer is normally twisted in one direction. The bundle may be twisted in the S direction or the Z direction. Since the number of filaments and the number of twists are as described above, the description thereof is omitted. The reinforcing cord of the present invention is produced in this manner. Two or more bundles of filaments coated with the coating layer may be bundled together to finally twist the resulting bundle. The direction of the final twist may be the same as or different from the direction of the twist of the bundle of filaments (the direction of the primary twist). Alternatively, two or more untwisted bundles of filaments coated with the coating layer may be bundled and twisted together into a strand.

The coating layer may be formed after the bundle of filaments is twisted. The type of filaments, the number of filaments, and the number of twists are as described above.

In the case where another coating layer (a second coating layer) is formed on the above coating layer (a first coating layer), the second coating layer can be formed by applying a treatment agent to the first coating layer and removing a solvent in the treatment agent.

EXAMPLES

Hereinafter, the present invention is described in more detail by way of examples.

Examples 1 to 11

First, 12000 carbon fiber filaments were bundled together to obtain a bundle of filaments. The carbon fiber filaments having an average diameter of 7 μm were used.

The resulting bundle was immersed in an aqueous treatment agent (A) having a composition shown in Table 1 below, and then dried at 200° C. for 2 minutes. Thus, one carbon fiber cord having the first coating layer was obtained. This carbon fiber cord was twisted at a rate of 60 times per meter in one direction. The composition ratio of each component shown in Table 1 is the composition ratio of the solid content of the component.

In Table 1, the hardness is the measured value of the hardness of a film of the aqueous treatment agent (A). The film of the aqueous treatment agent (A) was formed by putting the aqueous treatment agent (A) into a tray, removing water using a dryer, and then pressing it (at 160° C. for 30 minutes). The thickness of the film was 1 mm. The hardness of the film was measured by a durometer type A according to the hardness test based on JIS K 6253.

Next, in order to improve the adhesion to the matrix rubber, the second coating layer was formed on the above-described first coating layer by applying a treatment agent having a composition shown in Table 2 below onto the first coating layer. Thus, a reinforcing cord of Example 1 was obtained.

TABLE 2

| Components | Ratio (parts by mass) |
|---|---|
| Chemlok 233X (*1) | 100 |
| Xylene | 100 |

(*1) Manufactured by Lord Far East Incorporated

Reinforcing cords of Examples 2 to 11 were produced under the same conditions as those of Example 1, except that the composition of the aqueous treatment agent (A) for forming the first coating layer was changed. The compositions of the aqueous treatment agents (A) used in Examples 2 to 11 are shown in Table 1.

All of the aqueous treatment agents (A) used to form the reinforcing cords of Examples 1 to 3, 10, and 11 were free of a filler (silica or carbon black). In each of the aqueous treatment agents (A), the total mass of the crosslinking agents and the fillers is in a range of 10 to 20% of the mass of the rubber in the rubber latex.

All of the aqueous treatment agents (A) used to form the reinforcing cords of Examples 4 to 9 contain fillers. In each of the aqueous treatment agents (A), the total mass of the crosslinking agents and the fillers is in a range of 3 to 45% of the mass of the rubber in the rubber latex.

Comparative Examples 1 to 6

Reinforcing cords of Comparative Examples 1 to 6 were produced under the same conditions as those of Example 1, except that the composition of the aqueous treatment agent (A) for forming the first coating layer was changed. The

TABLE 1

| | | | Examples | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Aqueous treatment agent | Composition ratio (parts by mass) | Carboxyl-modified hydrogenated nitrile rubber latex (*1) | 100 | 100 | | 100 | 100 | 100 | 100 | | 50 | 100 | 100 |
| | | Carboxyl-modified nitrile rubber latex (*2) | | | 100 | | | | | 100 | 50 | | |
| | | 4,4'-bismaleimide diphenylmethane | 10 | 5 | 10 | 10 | 1 | 10 | 20 | 10 | 10 | 20 | 0 |
| | | Polyisocyanate | 10 | 5 | 10 | 10 | 1 | 10 | 20 | 10 | 10 | 0 | 20 |
| | | Silica | | | | 5 | 1 | | 5 | 5 | 5 | | |
| | | Carbon black | | | | | | 5 | | | | | |
| | Total of crosslinking agents (parts by mass) | | 20 | 10 | 20 | 20 | 2 | 20 | 40 | 20 | 20 | 20 | 20 |
| | Total of fillers (parts by mass) | | 0 | 0 | 0 | 5 | 1 | 5 | 5 | 5 | 5 | 0 | 0 |
| | Ratio of total of crosslinking agents and fillers to rubber (%) | | 20 | 10 | 20 | 25 | 3 | 25 | 45 | 25 | 25 | 20 | 20 |
| Hardness (°) | | | 74 | 65 | 70 | 74 | 60 | 74 | 75 | 71 | 71 | 72 | 74 |
| Strength retention (%) | | | 100 | 100 | 99 | 98 | 100 | 92 | 88 | 97 | 99 | 100 | 99 |

(*1) Zetpol Latex (carboxyl-modified and hydrogenated type: manufactured by Zeon Corporation)
(*2) Nipol Latex (carboxyl-modified type: manufactured by Zeon Corporation)

compositions of the aqueous treatment agents (A) used in Comparative Examples 1 to 6 are shown in Table 3. The composition ratio of each component shown in Table 3 is the composition ratio of the solid content of the component. Two different types of rubber latexes shown in Table 3 are the same ones as those shown in Table 1.

In each of the aqueous treatment agents (A) used to form the reinforcing cords of Comparative Examples 1 to 6, the total mass of the crosslinking agents and the fillers is in a range of 60 to 105% of the mass of the rubber in the rubber latex.

TABLE 3

|  |  |  | Comparative Examples | | | | | |
|---|---|---|---|---|---|---|---|---|
|  |  |  | 1 | 2 | 3 | 4 | 5 | 6 |
| Aqueous treatment agent | Composition ratio (parts by mass) | Carboxyl-modified hydrogenated nitrile rubber latex | 100 | 100 | 100 | 100 | 100 | 100 |
|  |  | Carboxyl-modified nitrile rubber latex |  |  |  |  |  |  |
|  |  | 4,4'-bismaleimide diphenylmethane | 30 | 30 | 40 | 50 | 30 | 30 |
|  |  | Polyisocyanate | 30 | 30 | 40 | 50 | 30 | 30 |
|  |  | Silica |  | 5 | 5 | 5 | 30 |  |
|  |  | Carbon black |  |  |  |  |  | 30 |
|  | Total of crosslinking agents (parts by mass) |  | 60 | 60 | 80 | 100 | 60 | 60 |
|  | Total of fillers (parts by mass) |  | 0 | 5 | 5 | 5 | 30 | 30 |
|  | Ratio of total of crosslinking agents and fillers to rubber (%) |  | 60 | 65 | 85 | 105 | 90 | 90 |
| Hardness (°) |  |  | 78 | 81 | 86 | 89 | 88 | 90 |
| Strength retention (%) |  |  | 75 | 65 | 45 | 33 | 47 | 0 |

In Examples 1 to 11 and Comparative Examples 1 to 6, the mass of the first coating layer was 20% of the total mass of the filaments.

Next, each of the reinforcing cords of Examples 1 to 11 and Comparative Examples 1 to 6 was embedded in the rubber having a composition shown in Table 4 below to produce a specimen (size: 300 mm×10 mm×3 mm) for a bending test.

TABLE 4

| Components | Mass ratios |
|---|---|
| Hydrogenated nitrile rubber (*1) | 70 |
| Hydrogenated nitrile rubber containing zinc dimethacrylate (*2) | 30 |
| Zinc oxide | 10 |
| Stearic acid | 1 |
| Carbon black | 30 |
| Trioctyltrimellitate | 5 |
| Sulfur | 0.1 |
| 1,3-bis(t-butylperoxyisopropyl)benzene | 6 |
| Magnesium oxide | 1 |
| 4,4'-(α,α-dimethylbenzyl)diphenylamine | 0.5 |
| 2-mercaptobenzimidazole zinc salt | 0.5 |
| Triallyl isocyanurate | 1 |

(*1) Zetpol 2020 (manufactured by Zeon Corporation)
(*2) Zetpol 2000L (manufactured by Zeon Corporation)

Figure 2:
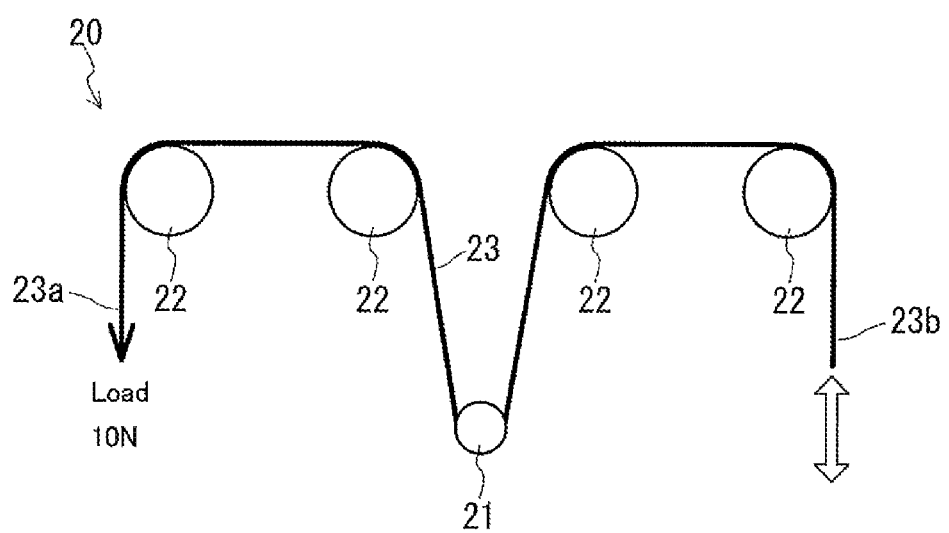
FIG. 2 is a diagram schematically showing a bending test performed in Examples.

Next, each specimen was subjected to a bending test in which the specimen was bent 100000 times. The bending test was performed using a bending tester 20 shown in FIG. 2. For each specimen, the tensile strengths before and after the bending test were measured. Herein, the tensile strength refers to the breaking strength obtained by performing a tensile test using a commonly-used tensile tester and a commonly-used cord grip. The unit of the tensile strength is N/cord.

The bending tester 20 includes one flat pulley 21 with a diameter of 10 mm, a motor (not shown), and four guide pulleys 22. First, a produced specimen 23 was hung on the five pulleys. Then, a weight was attached to one end 23a of the specimen 23 to apply a load of 10 N to the specimen 23. In that state, the other end 23b of the specimen 23 was reciprocated 10000 times in a direction indicated by an arrow in FIG. 2, so that the specimen 23 was bent repeatedly on the flat pulley 21. The bending test was performed at room temperature. After the bending test of the specimen 23 was performed in this manner, the tensile strength after the bending test was measured.

Then, for each specimen, the ratio of the tensile strength after the bending test to the tensile strength (100%) before the bending test, that is, the strength retention (%), was obtained. The higher the value of the tensile strength retention is, the higher the bending fatigue resistance is. Table 1 and Table 3 show the results of Examples 1 to 11 and Comparative Examples 1 to 6. Since the reinforcing cord of Comparative Example 6 was broken during the bending test, the strength retention thereof is shown as 0%.

As shown in Tables 1 and 3, the hardness of the first coating layers formed in Examples 1 to 11 were low. As a result, the cords of Examples 1 to 11 were more flexible and exhibited higher bending fatigue resistance than those of Comparative Examples 1 to 6.

Furthermore, the reinforcing cords of Examples 1 to 11 were subjected to an adhesion test to evaluate the adhesion to the matrix rubber. Specifically, first, a canvas, a reinforcing cord, and a matrix rubber sheet were stacked in this order, and the resulting stack was pressed under the conditions of 160° C. and 30 minutes. Thus, a specimen for the adhesion test was produced. The specimen was 25 mm wide, 150 mm long, and 3 mm thick. The matrix rubber containing hydrogenated nitrile rubber as a main component was used. For this test, first, the reinforcing cord and the matrix rubber were fastened respectively in an upper chuck and a lower chuck of a tensile tester. Next, the cord was stripped off from the matrix rubber, and how the specimen was broken was observed. In all of the specimens in which the reinforcing cords of Examples 1 to 11 were used, rubber fracture was observed. The rubber fracture refers to a fracture that occurs due to cracks formed in the matrix rubber, not an interfacial separation between the reinforcing cord and the matrix rubber. Accordingly, this adhesion test revealed that each of the reinforcing cords of Examples 1 to 11 and the matrix rubber were adhered together with sufficient adhesive strength.

Furthermore, as a comparative example, a reinforcing cord was produced in the same manner as in Example 1 except that the amount of the crosslinking agents in the aqueous treatment agent was 0.5 parts by mass, and subjected to an adhesion test. In this adhesion test for the comparative example, most of the matrix rubber peeled off at the interface between the reinforcing cord and the matrix rubber. This result suggests that when the amount of crosslinking agents is reduced, the adhesive strength between the matrix rubber and the treatment agent decreases or the adhesive strength between the treatment agent and the carbon fiber cord decreases. That is, this result shows that the amount of crosslinking agents in the aqueous treatment agent is preferably 1% or more of the mass of the rubber in the rubber latex.

The bundle of 12000 carbon fiber filaments was used as an example to describe Examples 1 to 11. However, the strength retention tends to increase as the number of filaments in the bundle decreases. Therefore, the number of carbon fiber filaments may be, for example, 6000, 3000, or 1000.

INDUSTRIAL APPLICABILITY

The present invention is applicable to a reinforcing cord for reinforcing a rubber product and to a rubber product including the reinforcing cord.

What is claimed is:

1. A reinforcing cord for reinforcing a rubber product, comprising at least one strand, wherein
    the strand comprises: a bundle of filaments that are bundled and twisted together in one direction; and a coating layer that is formed on at least a surface of the bundle,
    the bundle consists essentially of carbon fiber filaments,
    the coating layer is a coating layer that is formed from an aqueous treatment agent which is free of a resorcinol-formaldehyde condensation product and contains a rubber latex and a crosslinking agent as essential components and a filler as an optional component, and
    in the aqueous treatment agent, a mass of the crosslinking agent is in a range of 1 to 25% with respect to a mass of rubber in the rubber latex.

2. The reinforcing cord according to claim 1, wherein the number of the carbon fiber filaments in the bundle is in a range of 500 to 48000.

3. The reinforcing cord according to claim 1, wherein
    a surface of the carbon fiber filament in the bundle is treated with a sizing agent, and
    the sizing agent contains at least one selected from the group consisting of an epoxy group and an amino group.

4. The reinforcing cord according to claim 1, wherein in the aqueous treatment agent, the mass of the filler is in a range of 1 to 20% of the mass of the rubber in the rubber latex.

5. The reinforcing cord according to claim 1, wherein in the aqueous treatment agent, the mass of the crosslinking agent is in a range of 1 to 25%, the mass of the filler is in a range of 1 to 20%, and the total of the mass of the crosslinking agent and the mass of the filler is in a range of 2 to 45%, with respect to the mass of the rubber in the rubber latex.

6. The reinforcing cord according to claim 1, wherein a mass of the coating layer is in a range of 7 to 30% of a mass of the bundle of filaments.

7. The reinforcing cord according to claim 1, wherein the aqueous treatment agent contains, as a main component, a latex of at least one rubber selected from the group consisting of nitrile rubber, hydrogenated nitrile rubber, carboxyl-modified nitrile rubber, and carboxyl-modified hydrogenated nitrile rubber.

8. The reinforcing cord according to claim 1, wherein the crosslinking agent contains at least one selected from the group consisting of a maleimide crosslinking agent and polyisocyanate.

9. The reinforcing cord according to claim 1, wherein the filler contains at least one selected from the group consisting of silica and carbon black.

10. A rubber product that is reinforced by the reinforcing cord according to claim 1.

11. The rubber product according to claim 10, being a transmission belt.

12. The rubber product according to claim 11, being a synchronous transmission belt or a friction transmission belt.

13. The rubber product according to claim 12, being a toothed belt, a flat belt, a round belt, a V belt, or a V-ribbed belt.

14. The reinforcing cord according to claim 1, wherein the aqueous treatment agent contains filler.

15. The reinforcing cord according to claim 14, wherein the filler comprises silica.

16. The reinforcing cord according to claim 14, wherein a mass of filler is in a range of 1 to 20% with respect to a mass of rubber in the rubber latex.

17. The reinforcing cord according to claim 14, wherein a mass of filler is in a range of 1 to 10% with respect to a mass of rubber in the rubber latex.

18. The reinforcing cord according to claim 14, wherein a mass of filler is in a range of 1 to 5% with respect to a mass of rubber in the rubber latex.

19. The reinforcing cord according to claim 15, wherein a mass of filler is in a range of 1 to 5% with respect to a mass of rubber in the rubber latex.

* * * * *